United States Patent
Turnbull et al.

(10) Patent No.: US 12,003,560 B2
(45) Date of Patent: Jun. 4, 2024

(54) CONTENT DELIVERY—SETTING THE UNICAST RATE

(71) Applicant: BRITISH TELECOMMUNICATIONS PUBLIC LIMITED COMPANY, London (GB)

(72) Inventors: Rory Turnbull, London (GB); Timothy Stevens, London (GB); Stephen Appleby, London (GB)

(73) Assignee: BRITISH TELECOMMUNICATIONS public limited company, London (GB)

(*) Notice: Subject to any disclaimer, the term of this patent is extended or adjusted under 35 U.S.C. 154(b) by 0 days.

(21) Appl. No.: 17/764,821

(22) PCT Filed: Aug. 19, 2020

(86) PCT No.: PCT/EP2020/073238
§ 371 (c)(1),
(2) Date: Mar. 29, 2022

(87) PCT Pub. No.: WO2021/063594
PCT Pub. Date: Apr. 8, 2021

(65) Prior Publication Data
US 2022/0345508 A1    Oct. 27, 2022

(30) Foreign Application Priority Data
Sep. 30, 2019 (EP) .................... 19200625

(51) Int. Cl.
*H04L 65/612* (2022.01)
*H04L 1/00* (2006.01)
*H04L 65/611* (2022.01)

(52) U.S. Cl.
CPC .......... *H04L 65/612* (2022.05); *H04L 1/0002* (2013.01); *H04L 65/611* (2022.05)

(58) Field of Classification Search
CPC ..... H04L 1/0002; H04L 65/611; H04L 65/612
See application file for complete search history.

(56) References Cited

U.S. PATENT DOCUMENTS

| | | | |
|---|---|---|---|
| 7,472,197 B2 | 12/2008 | Li et al. | |
| 8,014,393 B1 | 9/2011 | Faheem et al. | |
| (Continued) | | | |

FOREIGN PATENT DOCUMENTS

CN    104769864    7/2015

OTHER PUBLICATIONS

International Preliminary Report on Patentability for PCT/EP2020/073238 dated Apr. 14, 2022 (7 pages).

(Continued)

*Primary Examiner* — Jeong S Park
(74) *Attorney, Agent, or Firm* — Nixon & Vanderhye P.C.

(57) ABSTRACT

Described is a method of managing a network for delivering content in a hybrid unicast/multicast network, where content is requested by clients over unicast, but all or some of the content is delivered in part over multicast. Typically, a client requests content (in the form of segments) via a first proxy. The segments are delivered to the first proxy over multicast from a second proxy, before onward transmission to the requesting client over unicast. The segments are also cached at the first proxy, and can be transmitted over unicast to other clients requesting those segments. However, problems can arise if cached segments are transmitted to clients too quickly. In one solution, the first proxy measures the multicast rate of delivery of segments from the second proxy over multicast, and limits the transmission rate of those segments over unicast to requesting clients to no greater than the measured multicast delivery rate.

12 Claims, 4 Drawing Sheets

(56) References Cited

U.S. PATENT DOCUMENTS

| | | | |
|---|---|---|---|
| 2003/0182437 A1* | 9/2003 | Kobayashi | H04L 47/30 709/232 |
| 2010/0115566 A1 | 5/2010 | Haimi-Cohen | |
| 2010/0254462 A1* | 10/2010 | Friedrich | H04N 21/4384 375/E7.027 |
| 2013/0128889 A1* | 5/2013 | Mathur | H04L 12/189 370/390 |
| 2013/0246578 A1 | 9/2013 | Moreman | |
| 2015/0043580 A1 | 2/2015 | Mantin | |
| 2015/0095509 A1* | 4/2015 | Huang | H04L 65/80 709/231 |
| 2015/0172747 A1* | 6/2015 | Huang | H04N 21/8586 725/100 |
| 2016/0269801 A1 | 9/2016 | Harden et al. | |
| 2018/0205802 A1 | 7/2018 | Bowen | |
| 2018/0248714 A1* | 8/2018 | Milescu | H04L 45/12 |
| 2018/0248806 A1 | 8/2018 | Burnley | |
| 2019/0260816 A1* | 8/2019 | Bradbury | H04L 65/612 |
| 2020/0107062 A1* | 4/2020 | Pichaimurthy | H04N 21/26616 |

OTHER PUBLICATIONS

Extended European Search Report dated Dec. 9, 2019, including the European Search Report and the European Search Opinion, in connection with corresponding EP Application No. 19200625.2 (8 pp.).

Combined Search and Examination Report under Sections 17 and 18(3) dated Mar. 30, 2020, in connection with corresponding GB Application No. 1914083.9 (6 pp.).

International Search Report and Written Opinion of the International Searching Authority dated Sep. 10, 2020, in connection with corresponding International Application No. PCT/EP2020/073238 (10 pp.).

V. Y. Borodakiy et al., "Analyzing Mean Bit Rate of Multicast Video Conference in LTE Network With Adaptive Radio Admission Control Scheme*", Journal of Mathematical Sciences, vol. 218, No. 3, Oct. 2016, 13 pp.

Office Action dated Nov. 2, 2023 issued for Chinese Application No. 202080066871.7 (8 pages).

* cited by examiner

CONTENT DELIVERY—SETTING THE UNICAST RATE

This application is the U.S. national phase of International Application No. PCT/EP2020/073238 filed Aug. 19, 2020 which designated the U.S. and claims priority to EP 19200625.2 filed Sep. 30, 2019, the entire contents of each of which are hereby incorporated by reference.

FIELD OF THE INVENTION

This invention relates to the field of content delivery using a combination of unicast and multicast.

BACKGROUND TO THE INVENTION

Increasing volumes of live content are being streamed using HTTP (or HTTPS). Popular live events drive extremely volatile demand, leading to a very high peak-to-mean ratio in traffic volumes. For example, the graph 100 in FIG. 1 shows an example of traffic volumes at gateways close to the edge of a mobile network taken during the Euro 2016 football competition. Plot 102 shows traffic volumes on a day (Wed $15^{th}$ June) without football, and plot 104 shows the traffic volumes the following day (Thu $16^{th}$ June) when there was a football match on (England vs Wales). Both plots show roughly the same traffic volumes through the day, except Plot 104 has a significant additional peak in traffic between around 1400 and 1600 hours, resulting from customers streaming the football match.

This high peak-to-mean ratio poses a particular challenge at the edge of the network, where such peaks can cause a degradation of the users' quality of experience.

Most commonly, content is delivered over the Internet using HTTP (or HTTPS) request/response pairs. Client applications will send an HTTP request to a server and a response will be returned containing the content requested. Such request/responses are unicast in nature.

HTTP(S) can be used for video streaming. Typically, the client will obtain a manifest file which will allow the URLs of individual files containing video segments to be determined. The client will then request these segments in sequence and concatenate them to form a continuous stream for playback. Each video segment may also be available at different bitrates to allow the video rate to adapt to the network throughput. This technique is known as HTTP Adaptive Streaming (HAS).

For users watching the same event, such as a live football match, each client will make their own HTTP requests and get their own HTTP responses, even though a large proportion of the content delivered to them within the HTTP responses will be identical between the clients. This results in very inefficient use of the network.

However, if the access network were able to use multicast for content delivery rather than unicast, then the impact of the live content peaks shown in FIG. 1 could be reduced significantly. Furthermore, the use of multicast in the access network could also significantly reduce the peak demand on the Content Delivery Network servers.

Solutions addressing such a problem already exist, where a multicast path is inserted into an otherwise unicast path between a client and a content server using proxies. Examples of such hybrid solutions include: "IP Multicast Adaptive Bit Rate Architecture Technical Report" OC-TR-IP-MULTI-ARCH-001-161026, 26 Oct. 2016, by Cable Labs; 3GPP specifications, 23.246 (MBMS Architecture and functional description), 26.346 (MBMS Protocols and codecs) and 26.347 (MBMS APIs); and DVB document A176, "Adaptive Media Streaming over IP Multicast", (8 Mar. 2018).

FIG. 2 shows a generalised example of such solutions.

In FIG. 2, there is shown a content server 202 providing content such as video to client devices 204a, 204b and 204c. Multicast Proxy X 206 and three Proxy Ys 208a, 208b, and 208c, are inserted into the otherwise unicast path between content server 202 and the client devices. Proxy X 206 acquires unicast content from the content server 202 and makes it available via multicast. Proxy Y receives the multicast content from Proxy X and caches it, making it available over unicast to any requesting client devices. All the client devices will receive identical responses to their requests for segments, as the same multicast content is received by all the Proxy Ys from Proxy X. The Proxy Ys can be located within the client devices, or separate devices or there may be just a single Proxy Y dependent on set-up.

In such a solution, Proxy X is pre-configured to act as a client, and independently makes requests for content segments and dispatches the entire response into the multicast network. Proxy X does this by first requesting a manifest file and then making timely requests for the content segments described within it. In some cases, the content serve may require client devices to authenticate themselves with valid credentials before content is served. Proxy X 206 effectively acts like a pseudo-client.

Furthermore, in such arrangements, it is important to manage the transmission of content segments from Proxy Y to client devices so as to avoid causing problems with adaptive streaming.

SUMMARY OF THE INVENTION

It is the aim of examples of the present invention to provide an improved content delivery mechanism.

According to one example of the invention, there is provided a method of managing content delivery at a network element to a client device, wherein the content comprises a plurality of segments, said method comprising:
  receiving one or more segments over multicast at a first network element;
  determining the bit rate at which the one or more segments is received;
  receiving unicast requests for segments from a client device at the first network element; and
  transmitting the requested segments from the first network element to the client device over unicast at a transmission rate no greater than the determined rate.

The one or more segments received at the first network element may be cached at the first network element.

The determined bit rate may be the multicast network rate.

The received segments at the first network element may be transmitted by a second network element. The first and second network elements may be proxy servers.

A method according to any preceding claim, wherein the content may be media content. The media content may comprise a video sequence.

According to a further example of the invention, there is provided a network element for managing content delivery to a client device, wherein the network element is adapted to:
  receive one or more segments over multicast;
  determine the bit rate at which the one or more segments is received;
  receive unicast requests for segments from a client device; and transmit the requested segments to the client device over unicast at a transmission rate no greater than the determined rate.

BRIEF DESCRIPTION OF THE DRAWINGS

For a better understanding of the present invention reference will now be made by way of example only to the accompanying drawings, in which.

DESCRIPTION OF PREFERRED EMBODIMENTS

The present invention is described herein with reference to particular examples. The invention is not, however, limited to such examples.

Examples of the present invention provide a method of managing a network for delivering content in a hybrid unicast/multicast network, where content is requested by clients over unicast, but all or some of the content is delivered in part over multicast. Typically, a client requests content (in the form of segments) via a first proxy. The segments are delivered to the first proxy over multicast from a second proxy, before onward transmission to the requesting client over unicast. The segments are also cached at the first proxy, and can be transmitted over unicast to other clients requesting those segments. However, problems can arise if cached segments are transmitted to clients very quickly, as the cached segments might be exhausted more quickly than they are received. This can result in buffer underflow at clients, as well as clients getting a false picture of the network delivery rate, which could result in switching to an unsustainable higher bit rate stream in adaptive streaming systems. The problem is solved here by the first proxy measuring the rate of delivery of segments from the second proxy over multicast, and limiting the transmission rate of segments over unicast to clients to no greater than the measured multicast rate.

Examples of the present invention can be applied to known unicast/multicast hybrid networks as discussed above, as well as to the invention set out in the Applicant's patent application EP19159748.3, which describes an arrangement referred to as "Multicast Assisted Unicast Delivery" (MAUD). In MAUD, multicast network is used to assist, rather than substituting for, an otherwise unicast path. Content is requested by client devices from a content server over unicast. The responses containing the requested content are separated into two components: a first component containing elements that are specific to individual client devices (for example session specific data), and a second component that is common to all client devices (typically this is the video content being requested). The first component can be delivered over unicast and the second component over multicast, and later recombined to form the original responses. The separation and recombination are handled by suitably configured proxy servers. Once recombined, the content can be delivered over unicast to the client devices. Examples of the present invention can be used to set a delivery rate for the content to the client devices over unicast.

Figure 1:
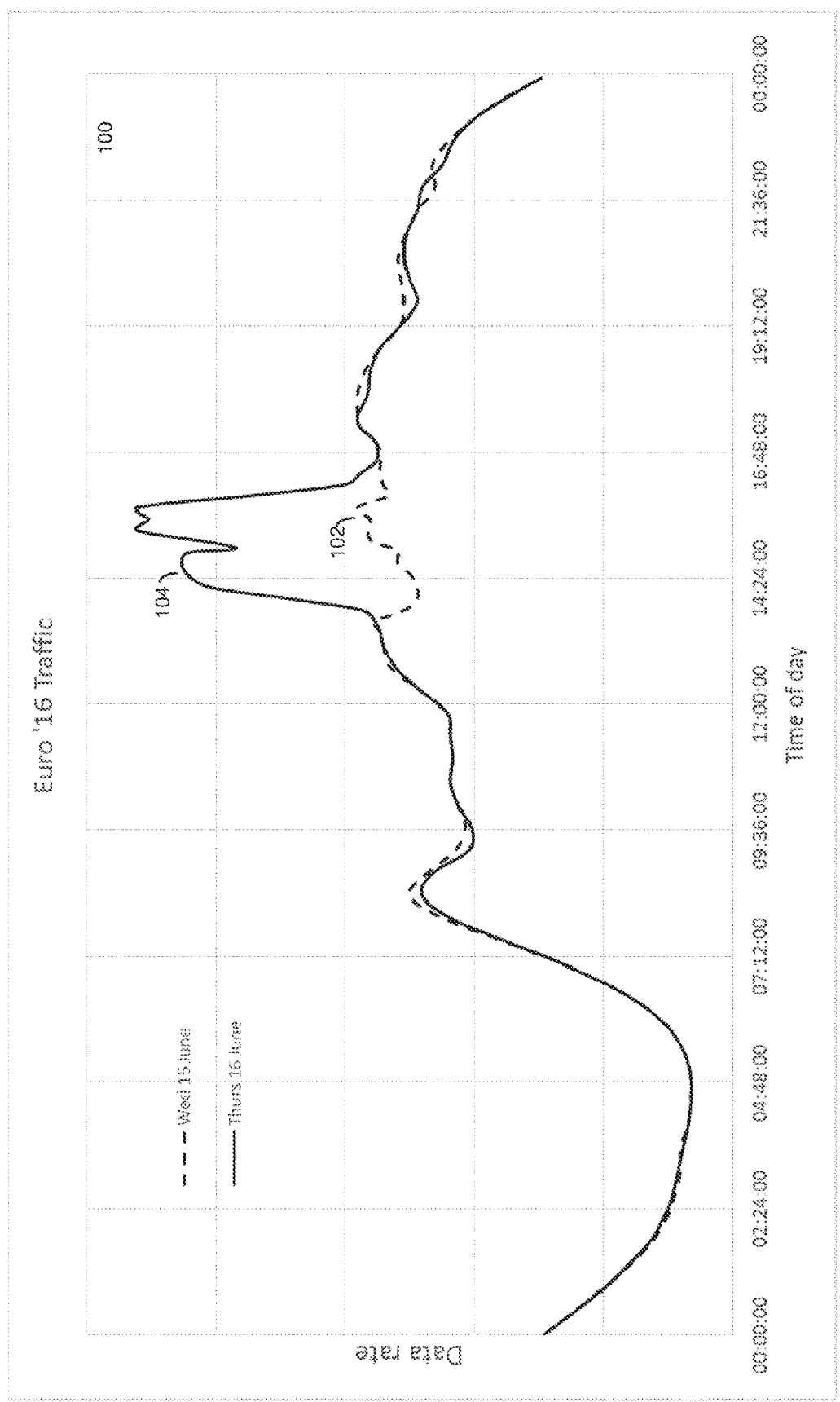
FIG. 1 is a graph showing traffic volume over a network on different days.
Figure 2:
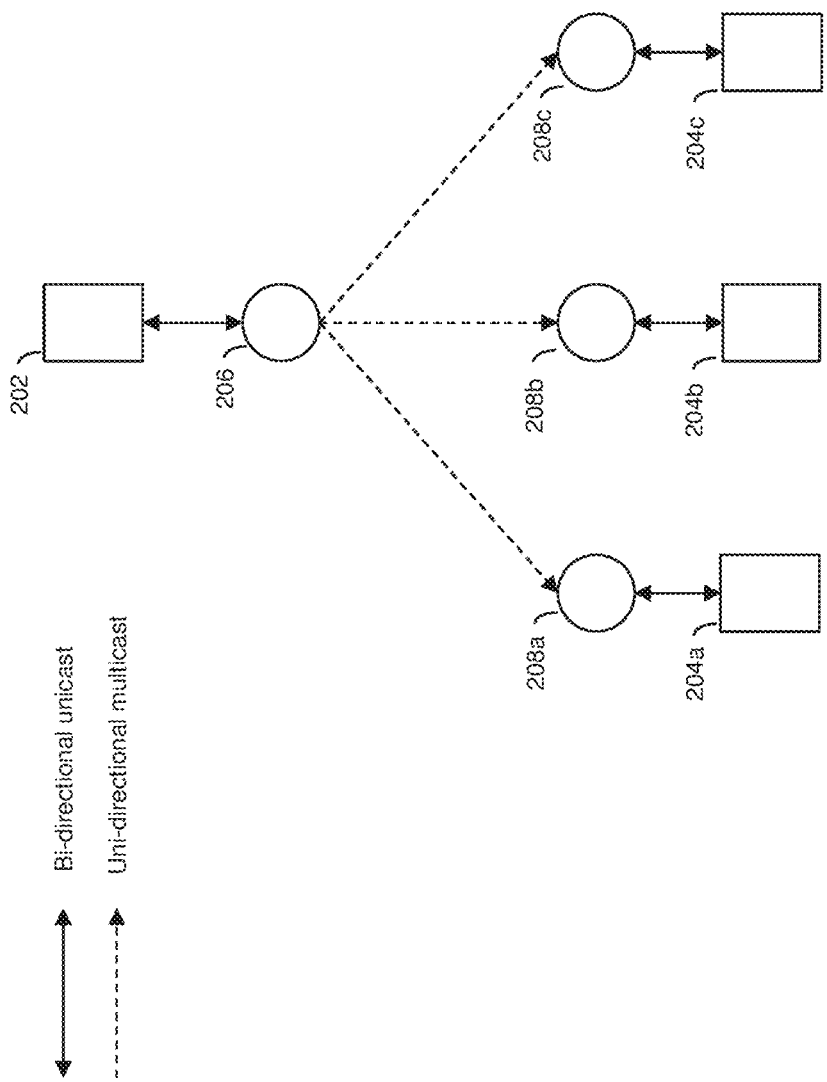
FIG. 2 is a network diagram of a general prior solutions.
Figure 3:
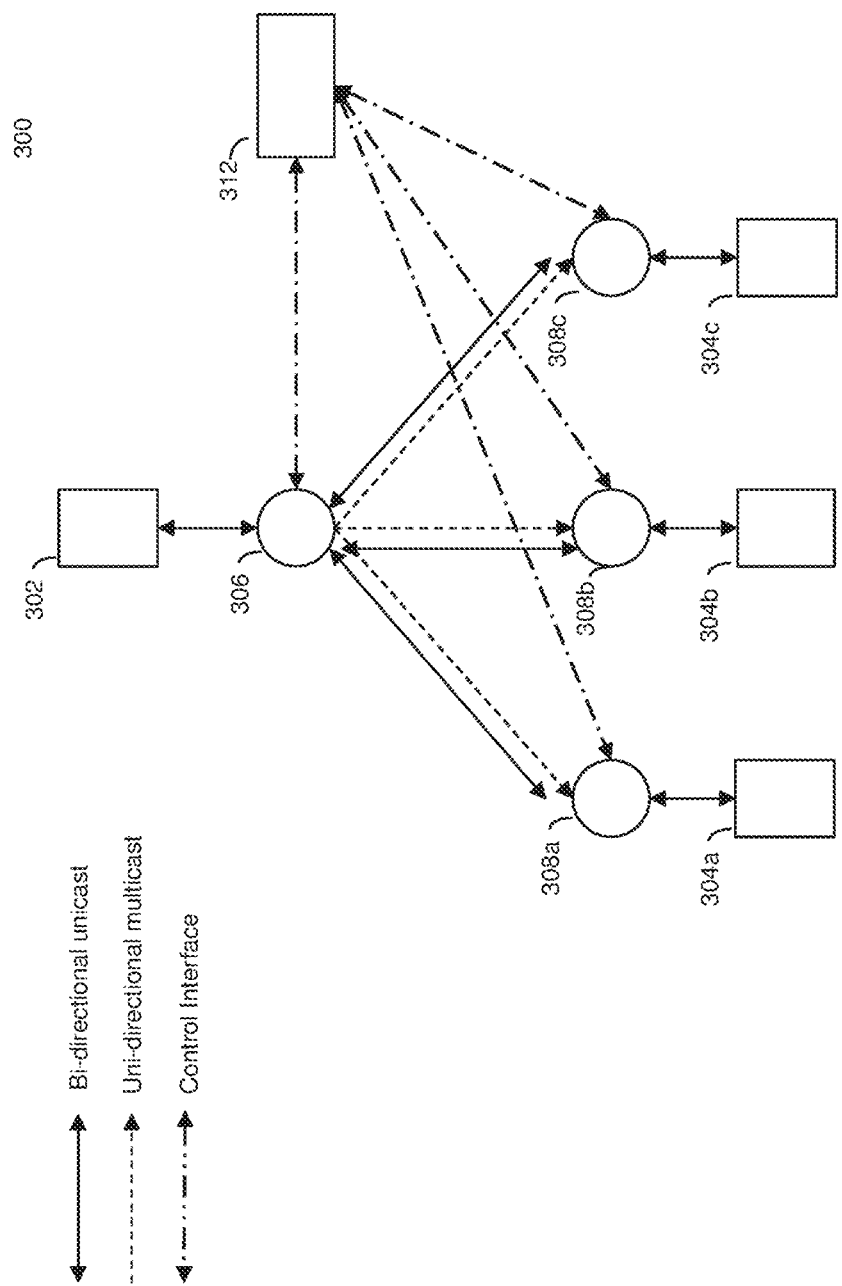
FIG. 3 is a network diagram showing the main components of an example of the present invention.

FIG. 3 shows the main components of a "Multicast Assisted Unicast Delivery" (MAUD) network supporting content delivery. The network 300 comprises a content server 302, a Proxy X 306, Proxy Ys 308a, 308b, and 308c, client devices 304a, 304b and 304c, and a multicast controller 312. The content server 302 provides content such as video to requesting entities, such as the client devices. The content server 302 may be located within a content delivery network (CDN), and there may be more than one content server. Proxy X 306 can communicate with the content server 302 over unicast. Proxy X 306 can also communicate with the Proxy Ys 308a, 308b, and 308c, over both unicast and multicast. The Proxy Ys can be located within the client devices, in separate devices (such as a home gateway), or there may be a single Proxy Y dependent on set-up.

Note, in FIG. 3, bi-directional unicast communication paths are marked with solid lines, uni-directional multicast communication paths are marked with dashed lines, and control interface communications paths are marked with a dot-dash line. The control interface communications paths carry control messaging/commands between the multicast controller 312 and other elements in the network.

The client devices are assumed to be running respective client applications, which are the source of content requests. For simplicity, the term client device from hereon in is used to refer to a client device running a client application. The client devices can make HTTP unicast requests for content held at the content server 302.

The content held at the content server 302 is typically media content (e.g. a TV programme, film or an entire linear TV channel) comprising video sequences encoded according a suitable standard such as the ITU H.264 standard. The video sequences are stored in the form of sequential temporal segments at the content server 302, where each segment is typically equivalent to 2 to 10 seconds of decoded video. Manifest files are used by clients to identify where segments are located (by a URL in the manifest). Thus, a client device streams a video sequence by using the manifest to determine where to direct sequential unicast requests for each segment in turn as required. Such an arrangement is used in HTTP Adaptive Streaming technologies such as MPEG-DASH and Apple's HLS (HTTP Live Streaming).

The multicast controller 312 (MCC) monitors the operation of Proxy X and the Proxy Ys to determine which traffic should use multicast assistance (MAUD), and controls the proxies accordingly. Thus, in examples of the invention, the client devices may receive some traffic from the content server 302 directly over unicast, and other traffic using MAUD.

Many HTTP requests made by the client devices for content will not make use of MAUD, and are sent directly to the content server.

Other requests for content from a client device that may benefit from MAUD are redirected to, or simply intercepted by, one of the Proxy Ys.

The Proxy Ys can be inserted in the HTTP path using any of a number of well-known techniques, such as using an HTTP redirection from the content server 302. In this case, the content server 302 would be configured such that requests for potentially popular content are not served directly but instead redirected to a suitable Proxy Y. For example, instead of supplying a normal response, the content server 302 could respond with an HTTP status code 307 which indicates a temporary redirect. This invites the client device to make a new request to the new URL supplied by the content server in its response, thus enabling requests to be made to Proxy Y. This technique allows the content server and proxy Y to exist in different domains, which would often be the case.

Other mechanisms to insert proxy Y in the HTTP path include: Proxy Y configured as a transparent proxy (though all requests are intercepted by it, and only works with unencrypted traffic); Proxy Y configured as a forward proxy (where the client device sends its requests directly to Proxy Y by virtue of being explicitly configured to do so); DNS hijacking (where a DNS server is configured to supply the IP address of Proxy Y for domains of interest); and manifest manipulation (where the manifest file is re-written so that requests are made directly to Proxy Y).

Figure 4:
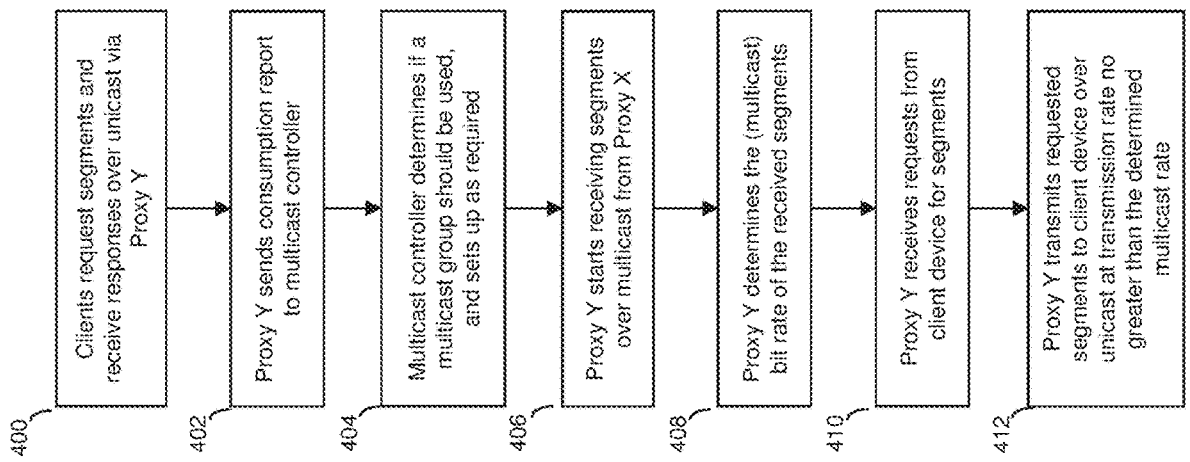
FIG. 4 is a flow chart summarising the steps of an example of the invention.

FIG. 4 shows a flow chart summarising the steps of a general example of the invention.

Starting at step 400, client devices make requests for segments of content, representing a film or live sports event for example, stored at the content server 302, and receives responses (the segments) over unicast via Proxy Y. For example, client device 304a makes HTTP GET requests, which are unicast in nature, directed to segments of content. Each HTTP GET request includes the URL of where that segment can be retrieved from. The URLs are found in the manifest file associated with the content. The requests are received by Proxy Y 308a, and forwarded to the content server 302.

The content server 302 responds with HTTP responses, each containing a requested segment. The HTP response is also effectively a unicast response. The responses are received by Proxy Y 308a and sent to the client device 304a. The received segments can then be viewed by the client device 304a.

The client device 304a can continue to request and receive segments according to step 400 until streaming of that content is complete. Other client devices can make requests for the same content and receive responses in a similar manner. However, in examples of the invention, the multicast controller 312 determines whether a multicast group should be used to deliver subsequent segments.

In step 402, Proxy Y 308a sends a consumption report data relating to the HTTP request/response pairs that are passing through the proxy e.g. the URL of each HTTP request. The consumption report can be sent to the multicast controller 312 at intervals, either time interval or after a certain number of segments have been requested/received.

Now, the HTTP requests and response described so far are all unicast in nature. However, it should be noted that requests for the same content might be made by multiple client devices. This is typical during for example a live football match. Proxy Y 308a and other Proxy Ys (308b or 308c) as appropriate send consumption reports to the multicast controller 312 for their respective client devices, so that the multicast controller 312 can determine whether or not to use multicast to help deliver further content.

In step 404, the multicast controller 312 uses the received reports to determine whether the HTTP requests reported from a given population of Proxy Ys justifies the use of multicast for their responses. Such a population of Proxy Ys is referred to as a 'cohort'. Assuming certain conditions are satisfied (for example, greater than a certain number of client devices requesting the same content), the multicast controller 312 will configure Proxy X and any relevant Proxy Ys (that is the cohort) for multicast assisted delivery by setting up a suitable multicast group.

Once the multicast group has been set up, content (requested segments) is sent from the content server 302 to Proxy X over unicast, and from Proxy X to Proxy Y over multicast, and then sent from Proxy Y to requesting client devices over unicast. This advantageously provides multicast delivery efficiencies, without having to disrupt the operation of the client devices.

In the cohort arrangement described, the content received over multicast at Proxy Y is cached so that other client devices requesting the same content can have that content delivered from the cache at Proxy Y.

The multicast controller 312 can add Proxy Y 308a to a cohort by sending Proxy Y 308a instructions to set up an HTTP request route, whereby requests matching a particular URL path/pattern/string are directed to Proxy X 306. The multicast controller 312 also sends Proxy Y 308a instructions to provision a multicast listener. The instructions tell Proxy Y 308a to prepare to receive multicast. The multicast listener causes Proxy Y to issue an IGMP join command to a multicast address specified by the multicast controller. Other Proxy Ys can be configured in the same way.

To allow the Proxy X 306 to use multicast for the return path for responses to requests that meet the match pattern set up for Proxy Y 306, the multicast controller 312 configures Proxy X 306 to use multicast for certain responses sent by the content server. For example, the instruction could be to only use multicast assistance for responses that contain video files or MIME types such as "video/mp4" or "video/MP2T", so that only responses containing video traffic are sent over multicast. In an alternative example, responses can be selected based on specific Etags or a range of Etags. Etags (Entity Tags) are part of the HTTP 1.1 specification and are used to uniquely identify response payloads.

Proxy X 306 and one or more of the Proxy Ys are now configured for respectively sending and receiving content over multicast.

In step 406, Proxy Y 308a will start receiving content segments over multicast from Proxy X. Note, for simplicity, this and the following steps are described with reference to Proxy Y 308a, although the skilled person will appreciate that any other Proxy Ys configured for multicast assistance will operate in a similar manner. Some or all of these segments are cached at Proxy Y, so that requests from more than one client for the same segment can be fulfilled without having to get the segment again from the content server.

The segments sent by Proxy X are at a bit rate equal to at least the media (encoding) rate of the segments, to ensure timely delivery of the segments to proxy Y. In practice the actual bit rate used could be set in other number of ways, including but not limited to that described in the Applicant's co-pending application EP19194759.7.

In step 408, Proxy Y 308a determines the bit rate of the segments received over multicast from Proxy X. That is, the network bit rate rather than the media encoding rate. For example, if a received segment is 10 Mb in size and takes 4 seconds to receive, then the network bit rate is 2.5 Mb/s. This network bit rate is also referred to as the multicast rate.

In step 410, Proxy Y 308a receives a unicast request from client device for a segment that is cached at Proxy Y 308a. Now, Proxy Y 308a could transmit the requested at almost any rate that is supported by the network link between Proxy Y 308 and the client device, as long as the requested segment has been cached. However, doing so would cause the client device to get a false picture of what rate the network as a whole could support, as the client device has no awareness that multicast is being used to assist with delivery over a portion of the route from the content server. Indeed, in an adaptive streaming system, delivering segments at a higher bit rate might cause the client device to think the network can support a higher bit rate stream, and start requesting segments of a higher rate. However, the network as a whole might not support delivery of the higher bit rate stream without buffer underflow at the client device. This would cause a client to switch to a lower bit rate stream. This could cause the client to oscillate between higher and lower bit rates streams which would be annoying for end users.

Therefore, given the above problems, in step 412 Proxy Y transmits the requested segment to the client device over unicast at a unicast rate that is no greater than the multicast rate determined in step 408. Requests by the client device for subsequent segments that are cached at Proxy Y 308*a* can be transmitted with the same bit rate limitation.

Note, segments are continuously being received at Proxy Y 308*a*, and simultaneously requests are being made for some It should be noted that examples of the above invention of setting the multicast rate can be applied to other hybrid unicast/multicast arrangements. For example, the Applicant's European patent application EP19159748.3 sets out an arrangement referred to as "Multicast Assisted Unicast Delivery" (MAUD). Content is requested by client devices from a content server over unicast. The responses containing the requested content are separated into two components: a first component containing elements that are specific to individual client devices (for example session specific data), and a second component that is common to all client devices (typically this is the video content being requested). The first component can be delivered over unicast and the second component over multicast, and later recombined to form the original responses. Typically, the client or session specific data is the segment header, and the common component is the payload portion of the segment. With such an arrangement, the above examples could measure the multicast rate as the rate of delivery of the common/payload portions rather than some combined reception rate of the payload plus header. This is because the size of the payload portions are typically be much larger than the header portions, plus the header portions are typically delivered in parallel with the payload portions, so would not contribute to the cost of delivery.

Note, the term "unicast" used in the described examples is intended to cover point-to-point communications services in general. Similarly, the term "multicast" is intended to cover point-to-multipoint services, including broadcast services.

In general, it is noted herein that while the above describes examples of the invention, there are several variations and modifications which may be made to the described examples without departing from the scope of the present invention as defined in the appended claims. One skilled in the art will recognise modifications to the described examples.

The invention claimed is:

1. A method of managing content delivery at a network element to a client device, wherein the content comprises a plurality of segments, said method comprising:
    i) receiving one or more segments over multicast at a first network element, and caching the one or more segments at the first network element;
    ii) determining a network bit rate at which the one or more segments is received;
    iii) receiving unicast requests for segments from a client device at the first network element; and
    iv) transmitting the requested segments from the first network element to the client device over unicast at a network transmission rate no greater than the determined network bit rate.

2. A method according to claim 1, wherein the determined network bit rate is a multicast network rate.

3. A method according to claim 1, wherein the received segments at the first network element are transmitted by a second network element.

4. A method according to claim 3, wherein the first and second network elements are proxy servers.

5. A method according to claim 1, wherein the content is media content.

6. A method according to claim 5, wherein the media content comprises a video sequence.

7. The method according to claim 1, further comprising sending, from the first network element, consumption report data relating to requests that have been received by the first network element.

8. A network element, including a processor, for managing content delivery to a client device, wherein the network element is adapted to:
    receive one or more segments over multicast;
    cache one or more received segments;
    determine a network bit rate at which the one or more segments is received;
    receive unicast requests for segments from a client device; and
    transmit the requested segments to the client device over unicast at a network transmission rate no greater than the determined network bit rate.

9. The network element according to claim 8, wherein the determined network bit rate is a multicast network rate.

10. The network element according to claim 8, wherein the network element is a first proxy server and the received segments at the first proxy server are transmitted by a second proxy server.

11. The network element according to claim 8, wherein the content comprises a video sequence.

12. The network element according to claim 8, wherein the network element is further adapted to send consumption report data relating to requests that have been received by the network element.

* * * * *